United States Patent
Harel et al.

(10) Patent No.: US 7,768,928 B2
(45) Date of Patent: Aug. 3, 2010

(54) CONNECTIVITY FAULT MANAGEMENT (CFM) IN NETWORKS WITH LINK AGGREGATION GROUP CONNECTIONS

(75) Inventors: Rafi Harel, Beer Yaakov (IL); Ronen Solomon, Givataim (IL)

(73) Assignee: Corrigent Systems Ltd., Tel-Aviv (IL)

( * ) Notice: Subject to any disclaimer, the term of this patent is extended or adjusted under 35 U.S.C. 154(b) by 286 days.

(21) Appl. No.: 11/483,650

(22) Filed: Jul. 11, 2006

(65) Prior Publication Data

US 2008/0016402 A1   Jan. 17, 2008

(51) Int. Cl.
*H04J 1/16* (2006.01)
*H04J 3/14* (2006.01)

(52) U.S. Cl. .................... 370/241.1; 370/241; 370/242; 370/245

(58) Field of Classification Search .................. None
See application file for complete search history.

(56) References Cited

U.S. PATENT DOCUMENTS

| | | | | |
|---|---|---|---|---|
| 6,512,742 | B1* | 1/2003 | Alexander et al. | 370/231 |
| 6,667,975 | B1* | 12/2003 | DeJager et al. | 370/389 |
| 7,023,797 | B2 | 4/2006 | Tagore-Brage | |
| 7,345,991 | B1* | 3/2008 | Shabtay et al. | 370/221 |
| 2002/0105949 | A1* | 8/2002 | Shinomiya | 370/386 |
| 2002/0110148 | A1* | 8/2002 | Hickman et al. | 370/475 |
| 2003/0128706 | A1* | 7/2003 | Mark et al. | 370/395.1 |
| 2004/0267959 | A1* | 12/2004 | Cochran et al. | 709/239 |
| 2006/0198315 | A1* | 9/2006 | Sasagawa et al. | 370/244 |
| 2006/0221974 | A1* | 10/2006 | Hilla et al. | 370/394 |
| 2006/0227704 | A1* | 10/2006 | Nakagawa et al. | 370/217 |
| 2006/0291378 | A1* | 12/2006 | Brotherston et al. | 370/221 |
| 2007/0133618 | A1* | 6/2007 | Brolin | 370/514 |
| 2007/0206562 | A1* | 9/2007 | Libby et al. | 370/351 |
| 2007/0248092 | A1* | 10/2007 | Yoshizawa | 370/392 |
| 2008/0069100 | A1* | 3/2008 | Weyman et al. | 370/390 |
| 2008/0095047 | A1* | 4/2008 | Skalecki et al. | 370/225 |

OTHER PUBLICATIONS

International Search Report Dated Sep. 24, 2008 From the International Searching Authority Re.: PCT/IL07/00702.
Written Opinion Dated Sep. 24, 2008 From the International Searching Authority Re.: Application No. PCT/IL07/00702.

* cited by examiner

*Primary Examiner*—Ajit Patel (57) ABSTRACT

A maintenance entity for an Ethernet Connectivity Fault Management (CFM) domain. The maintenance entity comprises a port definer module and a connection which is connected to a group of aggregated link. The port definer module examines a designated link of the group by forwarding CFM messages via the designated link.

32 Claims, 8 Drawing Sheets

CONNECTIVITY FAULT MANAGEMENT (CFM) IN NETWORKS WITH LINK AGGREGATION GROUP CONNECTIONS

FIELD AND BACKGROUND OF THE INVENTION

The present invention relates to Connectivity and Fault Management (CFM) and, more particularly but not exclusively, to implementing CFM techniques over networks that put into practice link-aggregation mechanisms.

As the number of Ethernet services grows, service providers require a robust set of management tools to maintain Ethernet service networks. For example, a set of Ethernet operation, administration and maintenance (OAM) functions, which is also known as a set of Ethernet Connectivity and Fault Management (CFM) functions, defines certain capabilities that are needed in order to assure the integrity and reliability of the network. Moreover, in order to adapt the Ethernet technology in a carrier-grade service environment, various Standards are being developed to provide advanced OAM/CFM capabilities across the entire network. For example, the IEEE 802.1ag Standard and ITU-T Recommendation Y.1731 incorporated by reference herein, define different CFM capabilities. By way of standardization, the CFM domain space is defined in terms of what are referred to as flow points. In the context of the IEEE 802.1ag specification suite, the flow points may be associated with maintenance entities (ME) as defined in related Standards documentation. A port can implement multiple MEs of different types. A flow point at the edge of a CFM domain is a maintenance end-point (MEP). A flow point inside a domain and visible to an MEP is a maintenance entity group (MEG) intermediate point (MIP). Whereas MEPs are active MEs, which may be used by system operators to initiate and monitor CFM activity, MIPs passively receive and respond to CFM flows initiated by MEPs. Each one of the MIPs and MEPs has a unique identity that uniquely identifies it in the Layer 2 network. Usually it is the MAC address of the interface which the MEP or MIP is associated to.

In parallel to the advancement in the progression of management tools for Ethernet service network maintenance, bandwidth has become a critical component in embedded network devices. The importance of bandwidth has increased as new applications demand higher transfer speeds. One costly solution for this problem is a complete upgrade of the underlying physical layer or data-link layer technology. Such technologies usually provide an order-of-magnitude increase in available bandwidth. However, such an upgrade involves large cost outlays due to network structure changes, and higher infrastructure and deployment costs. Thus, an engineering solution that requires minimal alterations in existing network infrastructure is needed. Such a solution, which has been adapted by many network planners, is a link aggregation group (LAG) mechanism. A LAG is a group of two or more network links bundled together to appear as a single link. For instance, bundling two 100 Mbps network interfaces into a single link creates one 200 Mbps link. A LAG may include two or more network cards and two or more cables, but the software identifies the link as one logical link. This solution allows the network planner to use two or more existing physical network links, such as cables or ports, to transfer packets of the same data from one entity to the other, without changing the structural properties of the network. In other words, the two or more network links are used in parallel in order to increase the logical link speed beyond the physical limits of any one of them. The LAG connection allows two or more links to be aggregated together in such a manner that a destination entity can treat data that is received from a number of links as a single logical link. For example, a LAG, which comprises N links, would consist of N parallel instances of point-to-point links, each of which is completely unaffected by being part of a group. Examples for modules that implement the LAG mechanism are Cisco's Catalyst 6500 series and Juniper's T-series platform.

When a LAG entity receives a frame to forward, it determines to which of several output ports to send the frame. The forwarding entity usually attempts to distribute the load evenly over each physical output port of the aggregated logical link. Usually, the frames distribution is based on a predefined hashing function.

It should be noted that LAG is also known as an Ethernet trunk, a network interface card (NIC) teaming, a port teaming, a port trunking, and a NIC bonding. LAG is based on the IEEE 802.3ad networking Standard, which is herein incorporated in its entirety by reference.

A new exemplary method for linking aggregation is disclosed in U.S. Pat. No. 7,023,797, issued on Apr. 4, 2006. The patent discloses methods and apparatuses to calculate an output mask in a network-switching engine that can support multiple aggregation methods. An aggregation table is programmed to include physical link selection information for two or more aggregation methods that are associated with two or more different LAGs.

When a certain network such as a local area network (LAN) or a virtual-LAN (V-LAN) employs LAG interfaces, some of the connectivity fault management functions as currently specified by the IEEE 802.1ag Standard and ITU-T Recommendation Y.1731 cannot be utilized and therefore cannot detect certain malfunctions. This inability is caused due to the fact that, when LAG interfaces are used, packets, which are forwarded from one entity to another are, not sent via a known single fixed network link but via a set of aggregated output links that comprise a single logical port or link. The packets are distributed among the links by a balancing algorithm which is implemented locally. Therefore, the path of each packet cannot be predicted by the originating ME that initiates the CFM function. That could affect the reception of reply messages (e.g. loopback or linktrace replies) and performance results such as frame delay variation. Moreover, as noted by the Standards, whenever one of the aggregated output links fails, the other aggregated output links in the group are configured to take up the traffic load that was being handled by the failed link in order to avoid disruptions in the communication among interconnected devices. Since the traffic load that was being handled by the failed link has been taken up by other aggregated output links in the group, the fault management functions of the CFM techniques cannot identify the failure. In networks that employ only single link connections, the failure identification is based on CFM techniques that detect link failures by Multicasting or Unicasting messages from a certain MEP to another ME. When LAG connections are used, messages are not transferred via one physical link, as described above and, therefore, the failed link is not detected.

There is thus a widely recognized need for, and it would be highly advantageous to have, an apparatus, a method, and a system for implementing fault management functions in networks with LAG connections which are devoid of the above limitations.

SUMMARY OF THE INVENTION

According to one aspect of the present invention there is provided a maintenance entity operable in an Ethernet Connectivity Fault Management (CFM) domain. The maintenance entity comprises a port definer module and a connection configured to be connected to a group of aggregated links. The port definer module is configured to examine a designated link of the group by forwarding at least one CFM message via the designated link.

Preferably, the port definer module is configured to examine a designated link of the group by receiving at least one CFM message via the designated link.

Preferably, the maintenance entity is one member of the group consisting of: a maintenance entity point (MEP) and a maintenance entity group (MEG) intermediate point (MIP).

Preferably, the CFM message is one member of the group consisting of: a continuity check message; a loopback message; a Link trace message; an alarm indication signal; a remote defect indication; a locked signal function; a test signal; a maintenance communication channel; a Vendor specific check; and an experimental operation, administration and maintenance (OAM) check.

Preferably, the CFM domain is implemented on one member of the group consisting of: a virtual local area network (V-LAN), a local area network (LAN), and an Ethernet service network.

Preferably, the designated link is associated with an additional maintenance entity of the CFM domain.

More preferably, the additional maintenance entity is associated with a certain flow point.

More preferably, the flow point is one member of the group consisting of: a switch port, a gateway port, a network port, a network node comprising a processing unit, and a network node comprising a switching unit.

Preferably, the CFM message comprises at least one LAG member field, the at least one LAG member field being configured for specifying the designated link.

More preferably, the forwarding is done according to the at least one LAG member field.

Preferably, the port definer module is configured to distinguish between the at least one CFM message and other messages.

More preferably, the other messages are forwarded according to at least one balancing algorithm, the at least one CFM message being forwarded according to a coupled specification.

Preferably, the maintenance entity further comprises a user interface configured for allowing a system operator to separately mark each aggregated link of the group, the forwarding being done according to a match between the marks and the at least one CFM message.

According to another aspect of the present invention there is provided a system for using Connectivity Fault Management (CFM) functions to examine aggregated link connections. The system comprises a plurality of maintenance entities connected to a CFM domain, each one of the maintenance entities comprising a port definer module and groups of aggregated links configured for connecting a first and a second of the plurality of maintenance entities. The port definer module of the first maintenance entity is configured for to examine a designated link of the group by forwarding at least one CFM message to the second maintenance entity via the designated link.

Preferably, each of the maintenance entities is one member of the group consisting of: maintenance entity points (MEPs) and maintenance entity group (MEG) intermediate points (MIPs).

Preferably, the CFM message is one member of the group consisting of: a continuity check message; a loopback message; a Link trace message; an alarm indication signal; a remote defect indication; a locked signal function; a test signal; a maintenance communication channel; a Vendor specific check; and an experimental operation, administration and maintenance (OAM) check.

Preferably, the CFM domain is implemented on one member of the group consisting of: a virtual local area network (V-LAN), a local area network (LAN), and an Ethernet service network.

Preferably, the CFM message comprises at least one LAG member field, the at least one LAG member field being configured for specifying the designated link.

More preferably, the forwarding is done according to the at least one LAG member field.

Preferably, the port definer module is configured to distinguish between the at least one CFM message and other messages.

More preferably, the other messages are forwarded according to at least one balancing algorithm, the at least one CFM message being forwarded according to a coupled specification.

According to another aspect of the present invention there is provided a method for implementing connectivity fault management (CFM) functions in a network. The method comprises a) connecting first and second maintenance entities via a link aggregation group (LAG), b) using the first maintenance entity for forwarding a CFM message via a designated link of the LAG, and c) verifying the functioning of the designated link by analyzing the outcome of the forwarding.

Preferably, the designated link is directly associated with the second maintenance entity.

More preferably, the first and second maintenance entities are associated with respective flow points.

More preferably, each one of the flow points is one member of the group consisting of: a switch port, a gateway port, a network port, a network node comprising a processor unit, and a network node comprising a switching unit.

More preferably, the method further comprising a step between step (a) and step (b) of marking aggregated links of the LAG, wherein the forwarding of step (b) is done according to a match between the CFM message and one of the marks.

Preferably, each one of the first and second maintenance entities is a member of the group consisting of: a maintenance entity point (MEP) and a maintenance entity group (MEG) intermediate point (MIP).

Preferably, the CFM message is one member of the group consisting of: a Continuity Check Message; a Loopback Message; a Link Trace Message; an Alarm Indication Signal; a Remote Defect Indication; a Locked Signal Function; a Test Signal; a Maintenance Communications Channel; a Vendor Specific check; and an Experimental operation, administration and maintenance (OAM) check.

Preferably, the network is one member of the group consisting of: a virtual local area network (V-LAN), a local area network (LAN), and an Ethernet service network.

Preferably, the CFM message comprises at least one LAG member field, the at least one LAG member field being configured for specifying the designated link.

More preferably, the forwarding of step (b) is done according to the at least one LAG member field.

Unless otherwise defined, all technical and scientific terms used herein have the same meaning as commonly understood by one of ordinary skill in the art to which this invention belongs. The materials, methods, and examples provided herein are illustrative only and are not intended to be limiting.

Implementation of the apparatus, method and system of the present invention involves performing or completing certain selected tasks or steps manually, automatically, or a combination thereof. Moreover, according to actual instrumentation and equipment of preferred embodiments of the apparatus, method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the apparatus, method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present embodiments comprise an apparatus, a system, and a method for implementing connectivity fault management functions in networks with link aggregation group connections.

The principles and operation of an apparatus, a system, and a method according to the present invention may be better understood with reference to the drawings and accompanying description. Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting.

One embodiment of the present invention is designed to provide a network node, which is associated with an ME, which is operable in a CFM domain. The network node comprises a port definer module and a connection which is configured to be connected to a group of LAG members. The port definer module is configured for allowing the separate examination of a designated link of the group of LAG members. The examination is done by facilitating the forwarding of CFM messages via the probed designated link and the reception thereof, as described below. It should be noted that the term LAG member may be understood as any physical aggregated link which is defined as one of the links that comprises a LAG connection.

Another embodiment of the present invention is designed to provide a system for using CFM functions to examine LAG members in different LAGs. The system comprises a number of maintenance entities which are connected to form a CFM domain on a certain network. Each one of the maintenance entities comprises a port definer module. One or more pairs of MEs are connected by a LAG connection. The port definer module of each ME is configured for allowing the examination of each one of the designated links that comprise the LAG connection. The examination is done by allowing the receiving of one or more CFM messages and the forwarding of them to another ME via a corresponding designated link.

Figure 1:
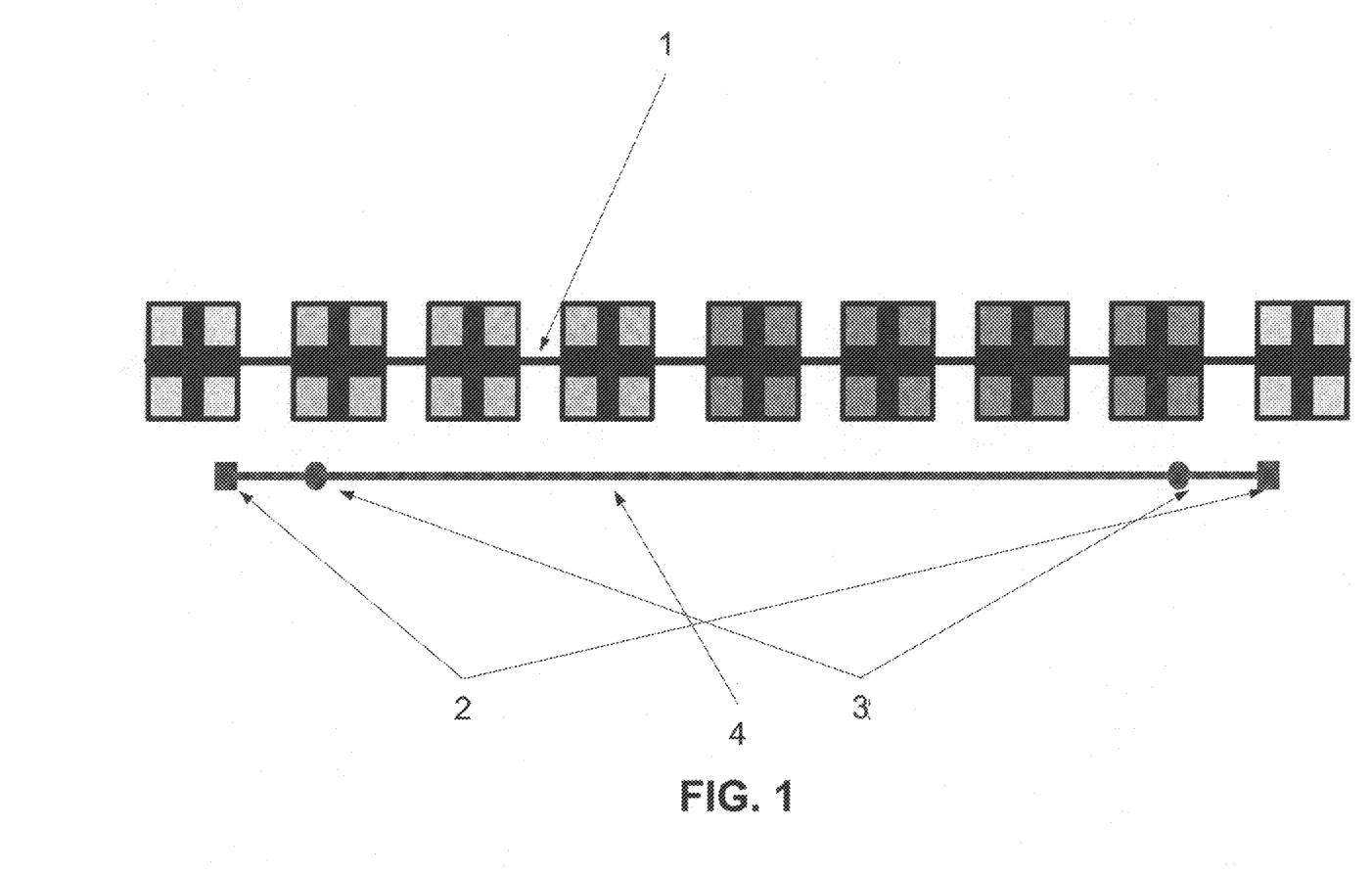
FIG. 1 is a schematic illustration of an exemplary network arrangement, which defines a maintenance domain.

Reference is now made to FIG. 1, which depicts an exemplary network arrangement 1 which defines a maintenance domain 4. The maintenance domain 4 is preferably an Ethernet CFM domain which is assembled from a number of MEs 2, 3. The MEs are defined as MEPs, as shown at numeral 2, and as MIPs, as shown at numeral 3. Preferably, the terms ME, MEP, MIP, maintenance level, and maintenance domain have the same meaning as in the ITU-T Y.1731 Recommendation and the IEEE 802.1ag Standards. The functions of the MEs in the present embodiments are preferably equivalent to the functions of the MEs in the ITU-T Standards.

The maintenance domain may be implemented using various transport technologies according to different protocols related to an end-to-end carrier-grade Ethernet service. These assorted technologies may include Ethernet over Synchronous Optical Network/Synchronous Digital Hierarchy (SONET/SDH), Ethernet over Asynchronous Transfer Mode (ATM), Ethernet over Resilient Packet Ring (RPR), Ethernet over Multiprotocol Label Switching (MPLS), Ethernet over Internet Protocol (IP), etc.

Usually, the CFM hierarchical arrangement divides the network into customer, provider, and operator maintenance levels. Accordingly, MEPs and MIPs can be defined in the Ethernet CFM domain 4, at any level of the CFM hierarchical arrangement, e.g., at the operator-level, at the customer-level, or at the service provider-level. At each level, the MEPs may have different service responsibilities and abilities.

The Ethernet CFM domain 4 is preferably defined according to recognized Standards such as IEEE 802.1ag and ITU-T SG 13 Q5 WG, which are incorporated by reference herein.

As described above, the present invention relates to a network arrangement 1 that uses link aggregation technologies. Link aggregation may be understood to describe parallel usage of network cables and ports for increasing the bandwidth of a single logical link beyond the limits of any one single cable or port. The Link aggregation is based on a networking Standard known as IEEE 802.3ad, incorporated by reference herein.

The aforementioned CFM domain is defined in order to allow the network operator to maintain and manage the network devices and connections it controls. Each one of the MEPs is preferably configured to perform different fault management functions according to ITU-T Standards, as described above. MEP nodes are operable to create various CFM frames, which may be used in CFM functions such as discovery, connectivity verification, latency/loss measurements, delay variation measurements, etc., within an end-to-end Ethernet network. In general, the CFM frames are issued on a per-Ethernet basis and may be understood as types of user data frames. Each frame is preferably differentiated, as further described below, by using certain predetermined Multicast addresses for CFM discovery and certain predetermined EtherTypes for CFM. Also, because Ethernet, as a connectionless transport technology, has the ability to send packets to different entities within the network that need not or should not receive them, domain-based CFM barriers or filters are also encoded therein.

Most of the CFM functions are performed by allowing one MEP to initiate a Unicast or a Multicast transmission to one or more different MEs. Examples of fault management functions are as follows:

1) Continuity Check (CC)—MEPs may have the ability to periodically exchange continuity check CFM messages to detect loss of continuity or incorrect network connections. A continuity check messages (CCM) is preferably Multicast to each ME in the maintenance domain, at each administrative level. CCM may also be used to perform frame loss measurements. A flag field is preferably incorporated into the CCM. This field includes a bit which is configured to indicate the occurrence of a remote defect.

2) Loopback Message (LBM) check—MEPs may have the ability to transmit loopback messages to verify connectivity with one or more MEs. A loopback message is a packet groper that tests the ability of a certain ME to communicate with another ME. An MEP sends a loopback request message to another ME, which generates a subsequent loopback reply message (LBR). LBMs and LBRs are used to verify bidirectional connectivity between the two MEs. LBMs may be sent by operator command or by instructing a MEP to send LBMs periodically. According to the IEEE 802.1ag Standard, loopback is a Unicast CFM message. The Y.1731 Recommendation allows both Unicast and Multicast loopbacks. An LBM check can also be used as an out of service diagnostic test. For such applications, which only apply to Unicast loopback frames, the loopback-OAM protocol data unit (PDU) also includes test pattern time, length, and value (TLV) parameters.

3) Link Trace Message (LTM) check—MEPs may Multicast LTMs on a particular maintenance domain to identify adjacency relationships with remote MEPs and MIPs at the same administrative level. An LTM check can also be used for fault isolation. The message body of an LTM includes a destination MAC address of a target MEP that terminates the link trace. When an MIP or MEP receives an LTM, it generates a Unicast link trace replay message (LTR) to the initiating MEP. It also forwards the LTM to the target MEP destination MAC address. An LTM effectively traces the path to the target MEP.

4) Remote Defect Indication (RDI)—When a downstream MEP detects a defect condition, such as a receive signal failure, it will send an RDI in the opposite, upstream direction to its peer MEP or MEPs. This informs the upstream MEPs that there has been a downstream failure. RDI is subject to the same multipoint issue as is an alarm indication signal (AIS). An MEP that receives an RDI cannot determine what subset of peer MEPs has experienced a defect. According to the Y.1711 Recommendation, RDI is encoded as a bit in the flag field in the CC messages. The IEEE 802.1ag Standard does not support RDI.

Other fault management functions such as a locked signal function, a test signal, a maintenance communication channel, a Vendor specific check, an experimental operation, an OAM check, etc. can also be implemented to verify the related network robustness.

As exemplified above, the fault management functions are performed by sending a message from a certain MEP to another ME. The premise in the base of the fault management functions is that a failure to transmit a message from one ME to another may indicate a malfunction in the link between them. However, this premise is incorrect if the maintenance domain is defined on a network arrangement that comprises a LAG that functions as one logical link between two different MEs.

Figure 2:
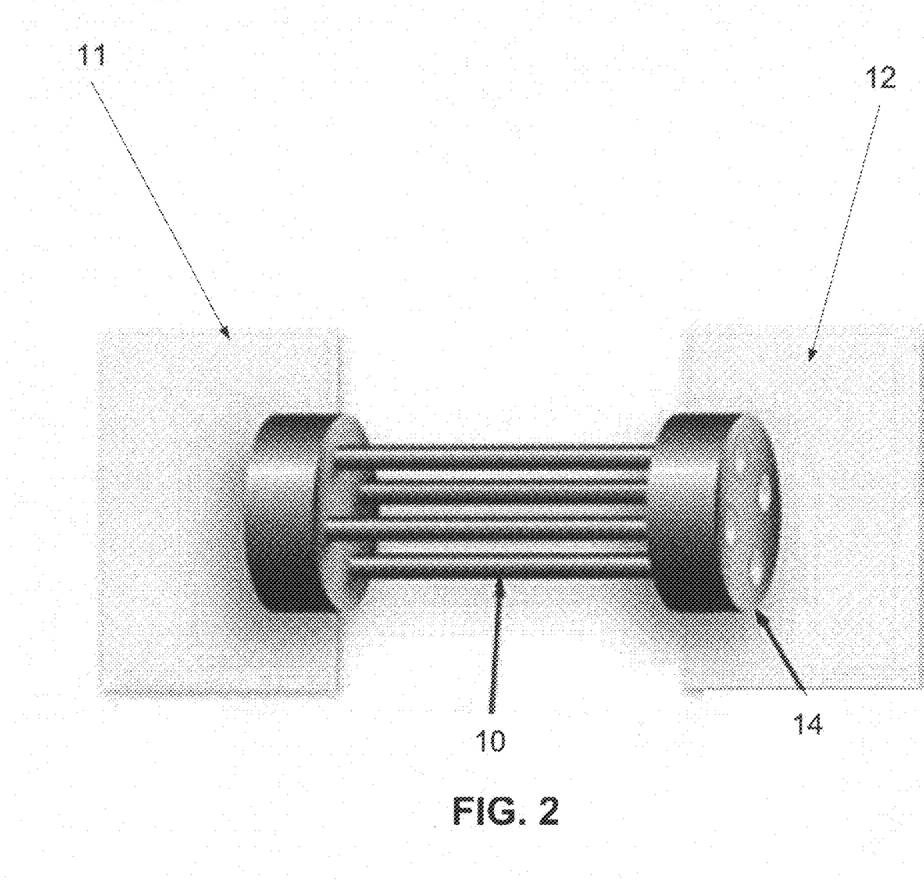
FIG. 2 is a schematic illustration of an exemplary LAG, which is used for connecting two network nodes.

Reference in now made to FIG. 2, which depicts an exemplary LAG 10 which is used for connecting two network nodes 11, 12. As described above, when a LAG connection is used, as shown at FIG. 2, packets, which are forwarded from one node 11 to another 12, are not sent via a single fixed network link but are distributed among LAG members that comprise a single logical link 14. Each one of the nodes is a network device that includes a mechanism or means for forwarding an input. In the present invention, such network nodes are also associated with MEs. Each which is defined in a given maintenance domain and represents a node requiring monitoring.

Typically, multiple physical links are provided to increase the bandwidth or the capacity of the link between two network devices, as described above. In order to use LAGs efficiently, the network device implements a balancing method in order to determine which physical link to use for forwarding of an input, or for the reception thereof. For instance, as inputs are forwarded through the system, they should be distributed among the multiple physical links in order to utilize efficiently the bandwidth. It should be noted that an input could be referred to herein as a frame, packet, or datagram. The data present in the input is any kind of data that are forwarded among the network devices and received by them. Typically, an input such as a frame includes information from which a number can be derived. Examples of such information are the lower two bits of the source MAC address, the destination MAC address or other such strings of information.

Figure 3:
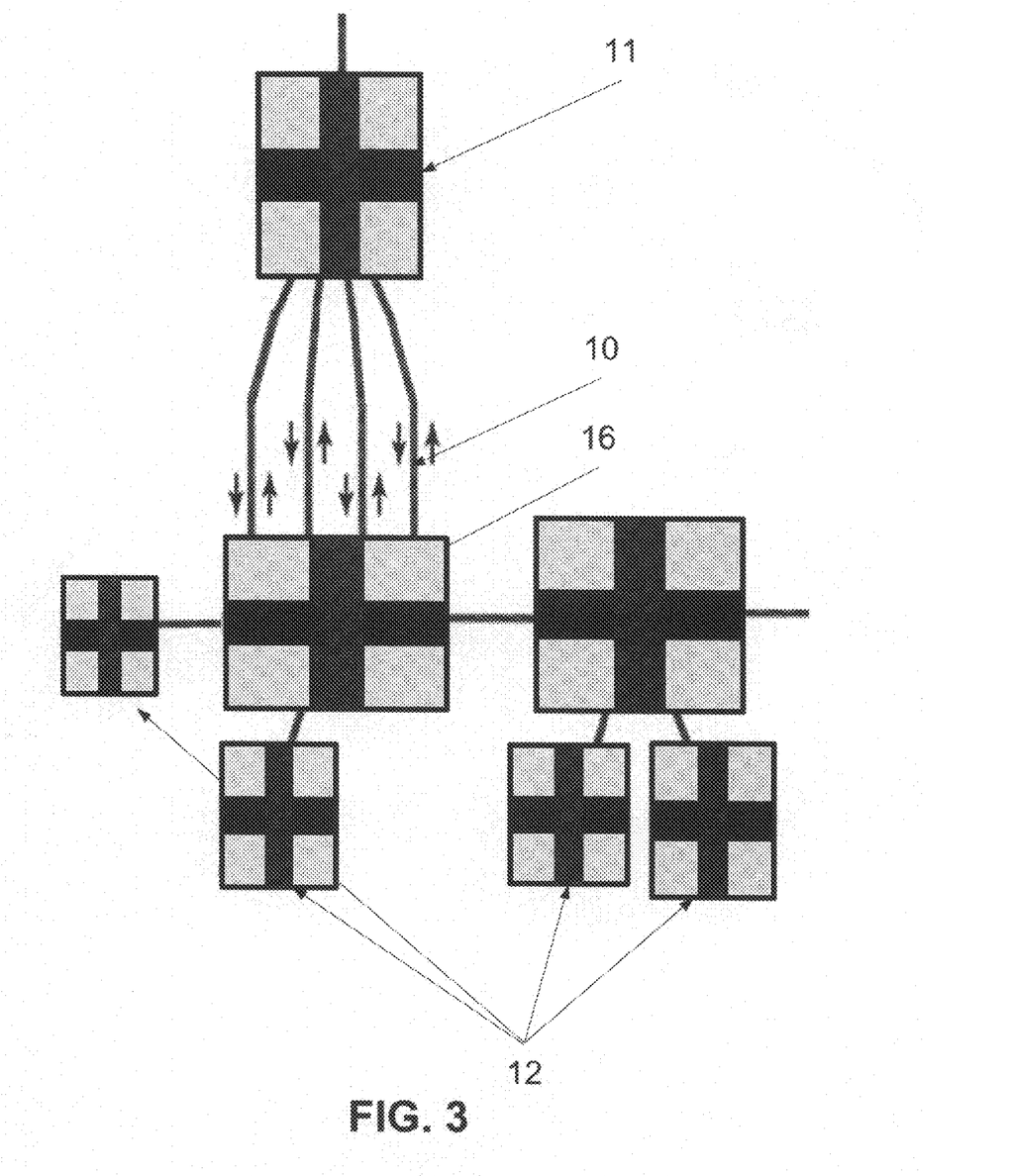
FIG. 3 is a schematic illustration of an exemplary network arrangement, which defines a maintenance domain having a LAG connection.

Reference is now made to FIG. 3, which depicts an exemplary network section having a LAG 10, which is used for connecting between a maintenance entity 11, which is preferably defined as an MEP, and several other maintenance entities 12, which are configured as MEPs or MIPs. The LAG 10 is preferably connected to a switch, which is associated with one or more MEs and comprises LAG interface 16. For an interface configured as LAG the switch unifies the frame flows that are received from the LAG members. As depicted in FIG. 2, the LAG 10 is used for allowing bidirectional frame flow between flow points and it is associated with an ME, which is used as a source point 11, and another ME, which is preferably used as a target point 12. Each one of the LAG members 10 is a bidirectional connection that adds a certain bandwidth, of preferably 100 Mbps or 1000 Mbps, to the logical connection between the source point 11 and a target point 12. Since the connection is bidirectional, each target point 12 may be used as a source point and vice versa. Clearly, in order to facilitate the transportation of frames via the LAG connection, the ports at both the source and the target points, which are connected to the LAG connection, have to be configured.

Preferably, every network port in the network arrangement 1 is associated with a globally unique identification address such as a MAC address. Preferably, frames that are transmitted over the network have source and destination address fields. The source address field indicates the originating port of the frame. The destination address field is used for indicating the destination in Unicast or Multicast transmissions. In the same manner, when a LAG connection is used, the ports of each LAG member are also identified by their MAC address.

Examples of mechanisms which are used for scaling the bandwidth in the LAG members are the Intel Link Aggregation® mechanism, the Cisco Fast EtherChannel®, and the Gigabit EtherChannel®. All of the scalable bandwidth features may be integrated seamlessly into Microsoft Windows NT®, Windows, Linux, and Novell NetWare operating systems. These technologies automatically balance traffic and require a switch, such as shown at numeral 16, which supports the reception of the packets. Both incoming and outgoing traffic is balanced and may be scaled in increments.

Usually, whenever one of the aggregated output links fails, the other aggregated output links in the group are configured to take up the traffic load that was being handled by the failed link, thereby avoiding any disruption in the communication among interconnected devices. Therefore, the fault management functions cannot indicate when a certain LAG member is not functioning properly. However, since some of the LAG members may become inactive due to failures, the maximal guaranteed and protected bandwidth capacity of the LAG may decrease.

Packets of the CFM messages are transferred, as any other packets, over the physical connections that connect among different entities in the network. However, in order to allow the operator to verify the connectivity of a specific LAG member using CFM functions, the CFM messages have to be directed via the specific LAG member.

As described above, each one of the MEs which are defined in a certain domain are associated with a certain node such as a switch, a gateway or any other digital equipment. Each one of the nodes comprises a processor unit such as a network processor unit (NPU) or another switching unit for performing similar forwarding functions. The NPU is a high-speed processor which is customized for packet forwarding functions. Each NPU is preferably coupled with an NPU Manager which is configured mange the NPU tasks and to provide NPU-related information to other software tasks.

As described above, during the performance of some of the CFM functions, a certain ME is chosen as a target ME. The NPU is configured to forward the CFM messages to the target ME according to the target ME address.

In one embodiment of the present invention, the NPU or the switching unit is configured to forward CFM messages to a target node via specific LAG member which is connected to it. In order to allow the performance of CFM function in a manner that facilitates the check of specific LAG members, some of the MEs in the maintenance domain are associated with both a node that requires monitoring, as described above, and a LAG member which is part of the LAG connection which is coupled to it. By associating the ME in such a manner we ensure that when this ME is chosen as a target in a certain CFM function, the related CFM message is forwarded via the associated LAG member. Clearly, this implementation allows as to separately verify the connectivity and communicatively of LAG members. In such an embodiment, the MEP that initiates the CFM function generates a CFM message that designates a combination of a node and the specific LAG member.

Figure 4:
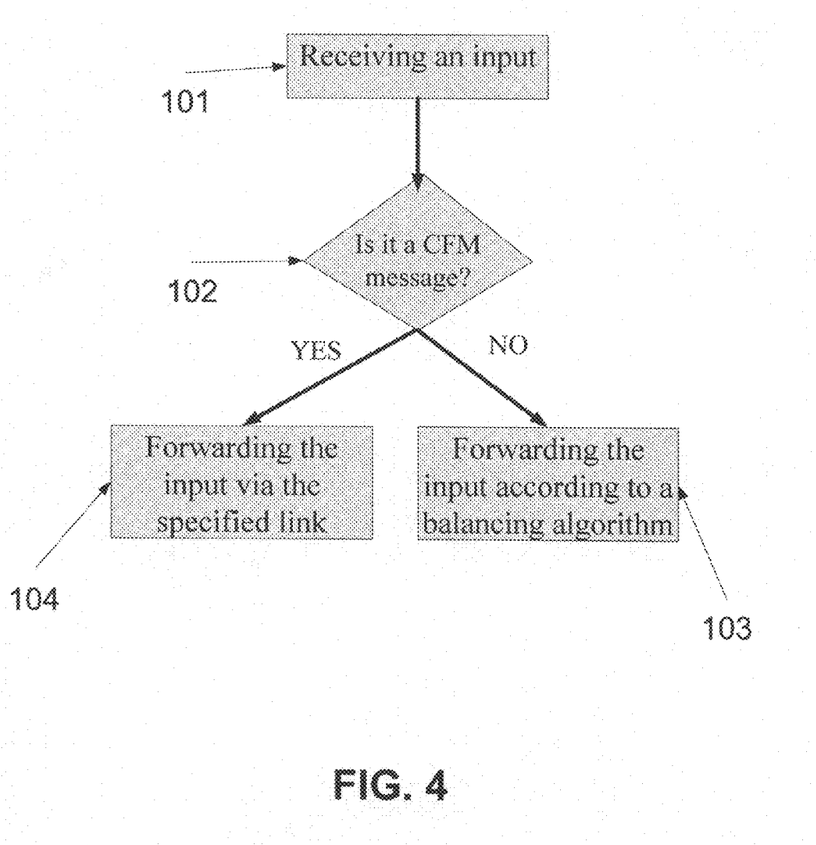
FIG. 4 is a flowchart of a forwarding process, according to a preferred embodiment of the present invention.

Reference in now made to FIG. 4, which is a flowchart that illustrates a forwarding process, according to a preferred embodiment of the present invention. In order to assure the transmission of the CFM message according to the specified LAG member, the source point and the target point which are connected via a certain LAG, as shown in FIG. 3, have to be adjusted. This adjustment is important to assure that each CFM message is transmitted via the LAG member it designates.

As described above, the source point 11 (FIG. 3) usually balances the packets which are transferred thereto in order to efficiently utilize the bandwidth of the links of the LAG. Many known balancing algorithms can be used to achieve this goal. The IEEE 802.3 Standard, for example, does not specify the algorithm for choosing a channel used to transmit any given packet, but assumes that the algorithm neither reorders the consecutive packets, nor duplicates the packets. In practice, the requirement of maintaining packet ordering is met by ensuring that all packets that comprise a given conversation are transmitted on a single channel. The distribution is preferably achieved by using a hash function. The distribution is done regardless of the packet source address 32 (FIG. 5), destination address 31, or type. In some of the embodiments of the present invention, distributing the packets among the LAG members regardless of their type may hinder their transmission, causing an erroneous evaluation of the specified LAG member. For example, a CFM message, which has been configured for checking a specific LAG member, may mislead the sending MEP if distributed via a random LAG member. As described above, in some embodiments of the present invention, the ME is associated with both a node and a specified LAG member for monitoring. During the performance of a CFM function, if the distribution is done regardless of the packet source destination, the CFM message which is designated to pass through a specific LAG member, as described above, is routed according to the balancing algorithm. Clearly, the outcome of such CFM function may mislead the sending MEP if the related CFM message is distributed via unspecified LAG member which has been chosen according to the balancing algorithm.

In order to avoid such errors, each source point is configured for identifying CFM messages and to forward them via an associated LAG member. Accordingly, when the source point receives or generates a CFM message, it does not forward it via an LAG member which has been chosen using a balancing algorithm such as a hashing function, but forwards the CFM message via the LAG member which it specifies.

In one embodiment, each network device flow point, which is configured as a source point, is adapted for receiving and forwarding inputs according to a predefined process, as shown in FIG. 4. The predefined process is implemented on the port definer module which is configured to forward frames to predefined ports. Preferably, the network device flow point, which is used as a source point, receives as input different frames from different network devices, as shown at 101. The network device is configured for analyzing the received input and determining whether it is a CFM message or another kind of data transmission, as shown at 102. If the input is not a CFM message, the received data transmission is forwarded to the target point via an LAG member which has been chosen according to a balancing algorithm, as shown at 103. In one example, the identification address of the input is used as an index to a table that includes information to determine to which physical link of a link aggregation group the input should be sent. The columns of the table correspond to physical links. However, if the input is a CFM message, the received input is forwarded to the ME which is defined as a target point via an LAG member which is associated with the ME and specified in the input itself or indicated through operator configuration, as shown at 104. Preferably, as described above, the CFM message is sent via an LAG member which either is configured or associated with the CFM message LAG TLV parameters, as described below.

Such an embodiment enables system operators to define the exact path of Ethernet CFM frames in a decisive and accurate manner. The system operator can configure not only which ME is to be tested, but also which physical link is to be tested.

Figure 7:
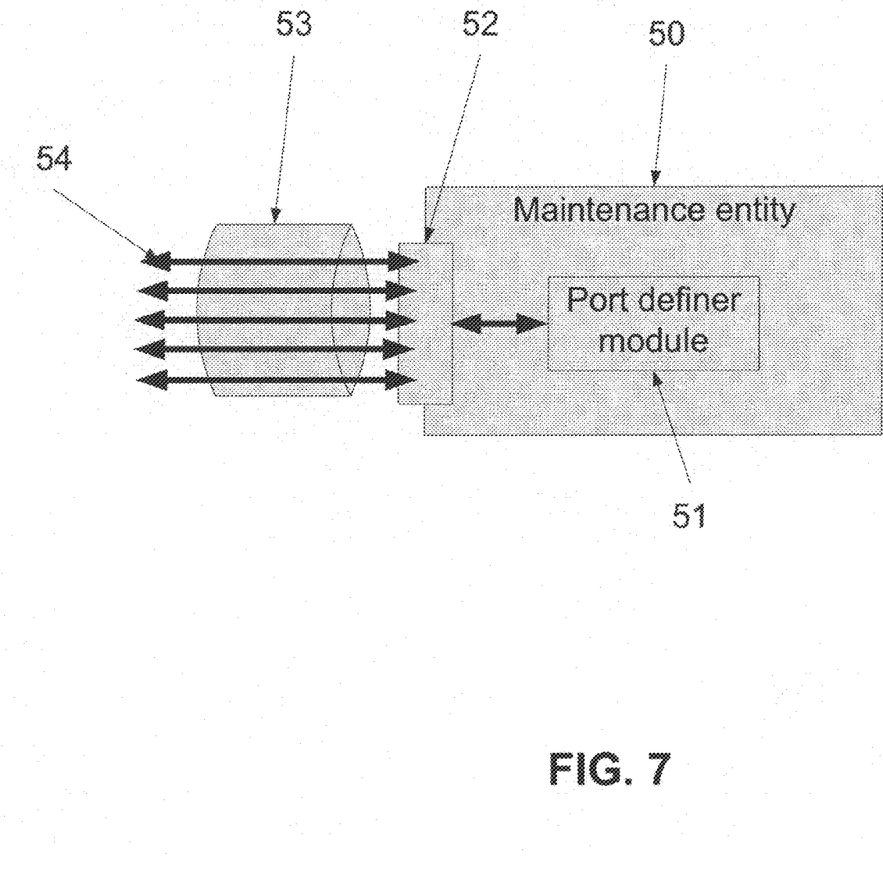
FIG. 7 is a schematic illustration of a network node, according to a preferred embodiment of the present invention.

FIG. 7 Preferably, a user network interface (UNI) can be used to input monitoring instructions that define the predetermined set of aforementioned rules. A common mouse device and a common desktop keyboard can be used as input devices, both connected to a computing unit, which controls a display device, and can allow a user to input monitoring rules and functions and to make selections. The UNI is configured to allow the network operator to determine through which LAG member the CFM messages are transmitted and received. In one embodiment of the present invention, the UNI facilitates the network operator to configure the NPU manager or the switching device of the nodes in a manner that facilities the forwarding and the receiving of CFM messages, as described above.

Figure 5:
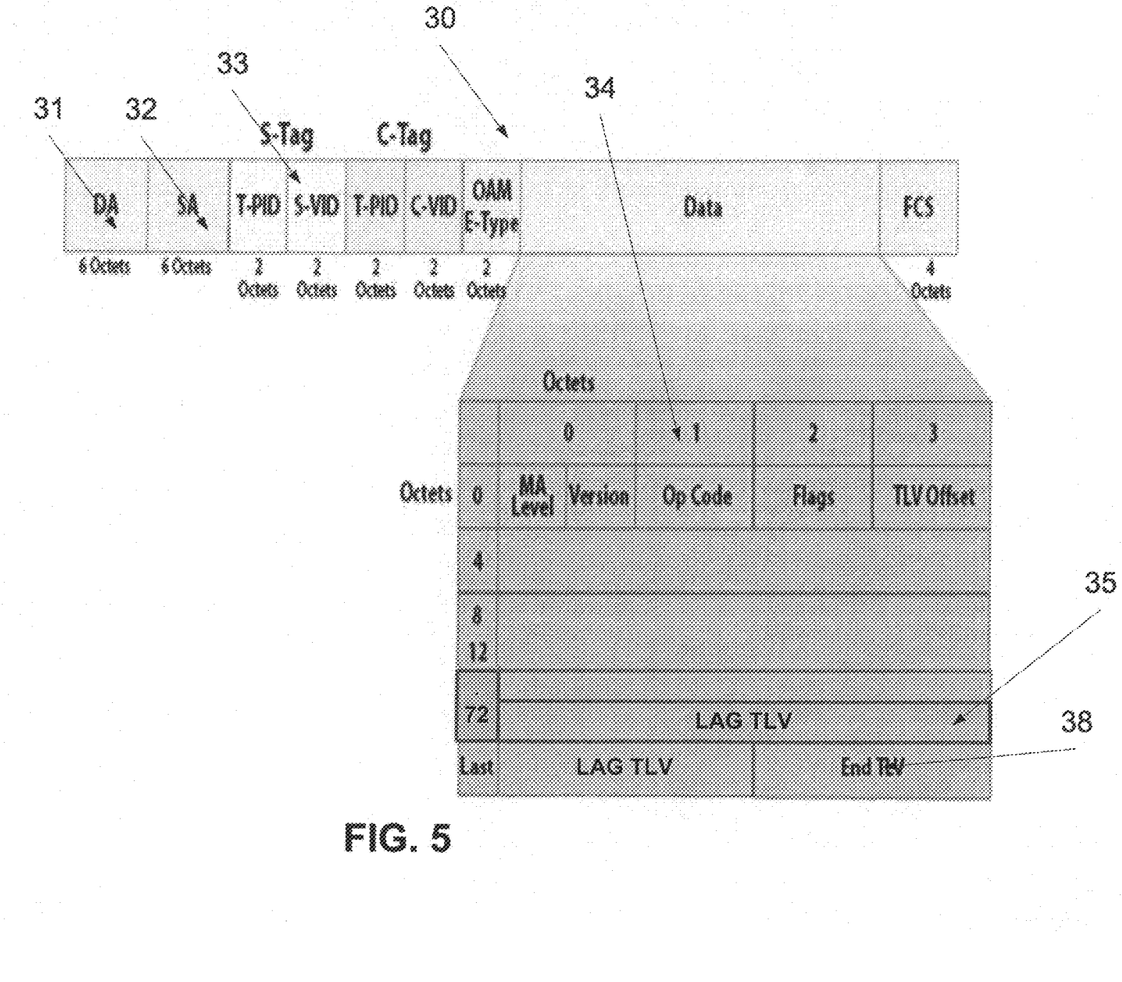
FIG. 5 is a simplified graphical representation of an Ethernet CFM frame, according to a preferred embodiment of present invention.

Reference is now made to FIG. 5, which is a graphical representation of an Ethernet CFM frame or message 30, according to a preferred embodiment of the present invention. FIG. 5 depicts a typical CFM frame 30 with a LAG TLV 35 which is used for specifying a certain source LAG member and certain destination LAG member. In one embodiment of the present invention, every CFM message, which is generated by one of the MEPs, comprises a representation of a certain LAG member. Such a representation can be a source or destination LAG member ID, which is configured to specify a certain source LAG member, or destination LAG member, or any other representation that specifies a certain LAG member. In such an embodiment, the MEP from which the CFM message 30 originates can use its LAG TLV field 35 for specifying a certain LAG member to be probed, as described below. This ability is preferably used to monitor the flow of frames, which are transferred through the LAG members, in order to determine, inter alia, if there is bidirectional frame flow.

In such an embodiment, when a certain MEP implements a CFM function, it specifies a targeted LAG member. As depicted in FIG. 5, when the generated CFM message 30 is one or more Ethernet frames, each Ethernet frame, as with all Ethernet frames, also comprises a destination address 31 and source address 32, which is preferably preceded by a seven-octet preamble and a one octet start of frame delimiter. The frame may include a customer Virtual LAN tag. It may also include some form of Ethernet connection delineation tag of service providers, such as an 802.1ad Provider Bridge S-Tag 33. OpCodes 34 usually indicate the CFM message type, Continuity Check, Loopback, etc. OpCodes (0-31) are assigned by the IEEE 802.1 Standard. Continuity Check, Loopback, and Link Trace use OpCodes in this range, and the OpCode assignments are the same for the Y.1711 Recommendation and the 802.1ag Standard. OpCodes (32-63) are assigned by ITU SG 13. Performance Management functions, which are only supported in the Y.1731 Recommendation, fall into this range. OpCodes (6-255) are assigned by the IEEE 802.1 Standard. Flags are an 8-bit field. TLV Offset is a 1-octet field, which contains the offset to the first TLV in an OAM protocol data unit relative to the TLV Offset field. As commonly known the TLVs are type, length, and value, encoded parameters that are included in the message body. For each TLV, there is a one-octet type field, followed by a two-octet length field and an N octet value field. The End TLV 38 has a Type field equal to 0 and the Length and Value fields are not used. In one embodiment of the present invention, a LAG TLV field 35 is defined in order to designate a certain LAG member ID field.

Figure 6:
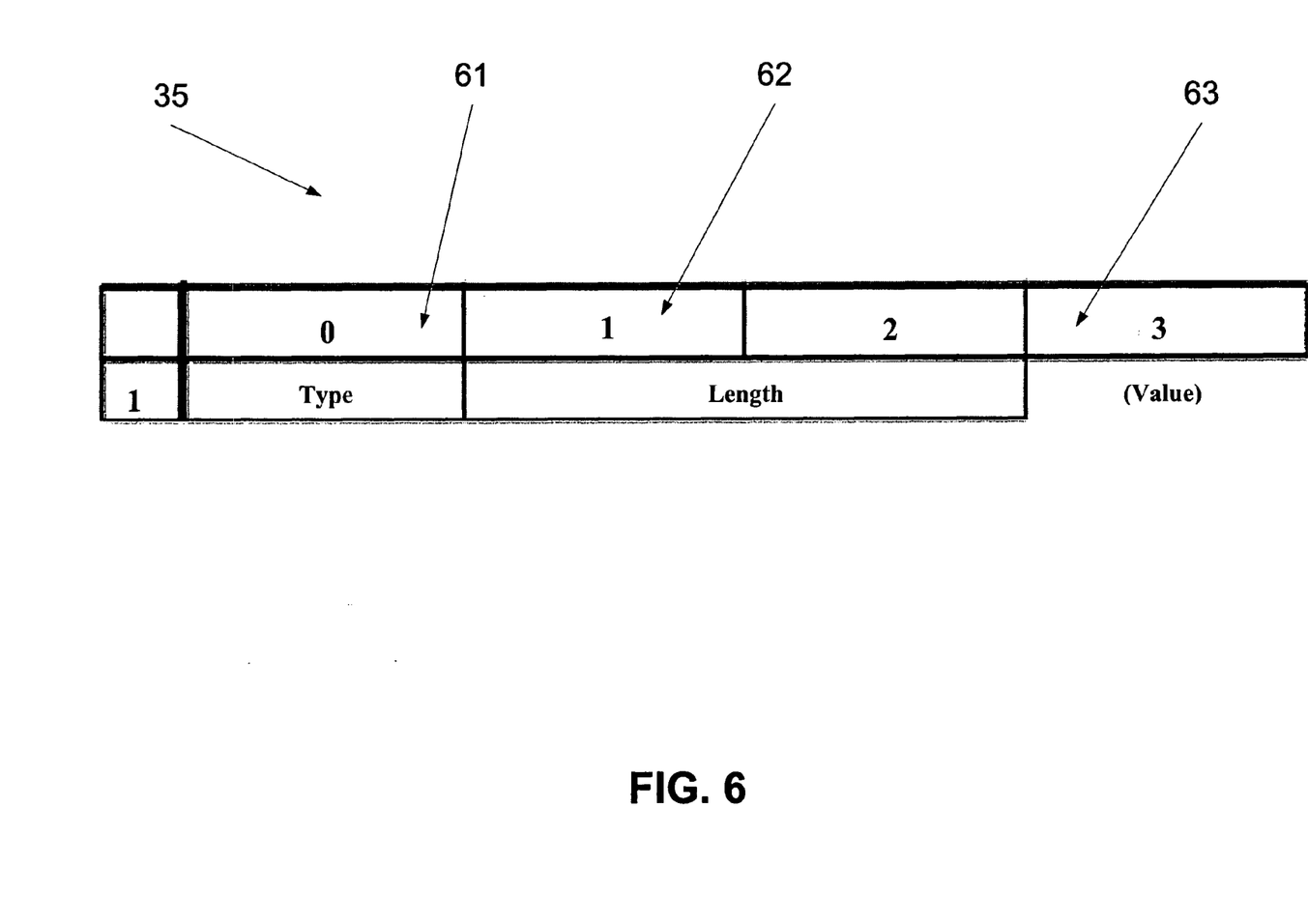
FIG. 6 is a simplified graphical representation of an LAG TLV field, according to a preferred embodiment of present invention.

Reference is now made to FIG. 6, which is a graphical representation of a LAG TLV field 35, according to a preferred embodiment of the present invention. The LAG TLV field comprises, as any other TLV field, a type subfield 61, a length subfield 62, and a Value subfield 63. The value subfield 63 includes a source LAG member identification and the destination LAG member identification. The LAG member identification is preferably the MAC address of related ports. The TLV may be added to every message which is sent, even if the receiving ME is not associated with a LAG interface or a member. Since the LAG TLV is defined within the TLVs section, MEs without LAG interface ignore the LAG TLV.

In use, during the implementation of a CFM function, the MEP can generate CFM messages, which are used for validating the functioning of both the MEs and LAG members of different LAGs in the system. Each CFM message 30 may specify a target ME such as destination address 31 and a targeted LAG member such as the LAG TLV. As described above, the CFM functions are performed by either Multicasting or Unicasting messages to different MEs. Accordingly, during a Multicast function, a CFM message is preferably Multicast to each ME in the maintenance domain via the designated LAG member which is identified in the CFM message as the source LAG member ID in the LAG TLV, as described above. The inability of the CFM message to arrive at the designated ME via a certain LAG member clearly indicates that the certain LAG member failed the CC. During a Unicast function, a CFM message is sent to the target ME via the LAG member which is specified in the LAG TLV. Preferably the user can configure the CFM messages using the UNI, as described above. The inability of the CFM message to arrive at the targeted ME clearly indicates a failure in one or more of the designated LAG members.

For example, during a CC, which is a Multicast function, specific LAG members are specified in one or more of the transmitted CCMs. Instead of configuring MEPs to Multicast CCMs to MEs according to their destination address 31, the CCMs are Multicast to MEs according to both their destination address 31 and a designated LAG member. This implementation allows the system operator to validate the functioning and connectivity of both the MEs and the LAG members. Failure to transmit a CCM via one of the LAG members of a certain LAG to a certain ME, while succeeding to transmit an equivalent CCM via the other LAG members of the same LAG clearly indicates a failure in the LAG member which has been specified in the failed CCM. Preferably, during a CC, a CCM is Multicast to each ME in the maintenance domain via each one of the LAG members that leads to it.

In another example, during a Unicast LBM check, all the LAG members may be checked if MEPs are associated to all the links. During the check, the each MEP transmits an LBM to verify connectivity with a certain ME. The target MEP generates a subsequent LBR in response to each one of the messages it receives. LBMs and LBRs are used to verify bidirectional connectivity between the two MEs via each one of the LAG members.

Reference is now made to FIG. 7 which depicts an exemplary network node 50 which is operable in a CFM domain, according to one embodiment of the present invention. The depicted network node 50, which is preferably a MEP, is configured for allowing the examination of a designated link in a LAG by allowing the receiving and forwarding of CFM messages via the designated link, as described above.

The network node 50 comprises a port definer module 51, which is preferably implemented on a processor based electrical circuit. The network node 50 further comprises a connection 52 that has multiple ports, which are configured to be connected to a group of LAG members 54. The group of LAG members 54 functions as one logical link 53. The port definer module 51 is preferably designed to communicate with the connection 52. NICs may also be used together to form network links in the connections, the links having a speed greater than that of any one NIC. For example, this allows a network node to establish a 2-gigabit connection using two 1-gigabit NICs together.

The port definer module 51 is configured to control the receiving and forwarding of messages via the group of LAG members 54. In use, the connection 52 is preferably used for receiving input of frames from other network devices which are connected to a maintenance domain. In another embodiment of the present invention, the network node 50 is an MIP. In such an embodiment the network node 50 further comprises another connection. Frame flow is received from one of the connections and forwarded via the other connection according to the LAG member which may be either configured or specified in the received CFM message, as described above.

The port definer module 51 is configured to identify, if specified, a designated LAG member. In one embodiment of the present invention, the port definer module 51 converts the value which is recorded in a LAG ID field to a physical address that represents one of the LAG members which are connected to the connection 52. Then, the port definer module 51 instructs the embedded NPU (Network Processor Unit) or the switching device to forward the received CFM message, using the connection 52, via a corresponding identified LAG member. In another embodiment of the present invention, the port definer module 51 instructs the embedded NPU or the switching device to forward the received CFM message to a ME which is associated with a certain node and a certain LAG member, as described above.

Preferably, the UNI is configured for allowing the system operator to tag each one of the LAG members. In use, after the LAG members are tagged, each one of the CFM messages can be defined in a manner that specifies one or more LAG members. Each source point, which is connected to a certain LAG, is configured to forward the CFM message according to the specified tag, as described above.

Figure 8:
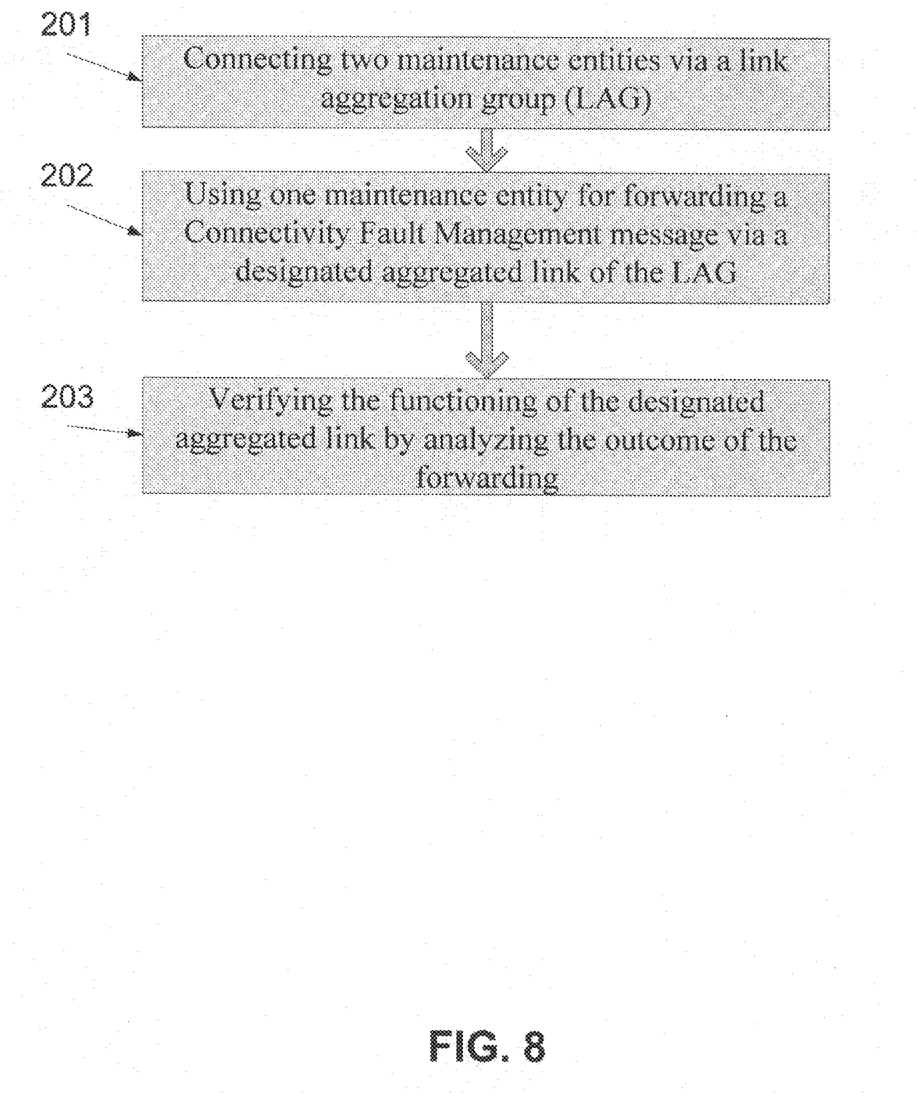
FIG. 8 is a flowchart of an exemplary method for implementing CFM functions in a network, according to a preferred embodiment of the present invention.

Reference is now made to FIG. 8, which is a flowchart of an exemplary method for implementing CFM functions in a network, according to a preferred embodiment of the present invention.

As depicted in FIG. 8, during the first step, 201, two MEs are connected via a group of LAG members. As described above, if the network comprises several MEs, more than one LAG may be used to network among them. Following the connecting of the MEs, at step 202, one of the MEs is used for forwarding and receiving a CFM message via a designated LAG member of the LAG. As described above, an MEP, which is connected to the CFM domain, can be used for implementing a CFM function. Accordingly, during the performance of such a function, one of the MEs receives a related CFM message. During step 202, the CFM message is forwarded and received via a designated LAG member of the LAG to another ME. This forwarding and receiving enables verifying of the functioning of the designated LAG member, as shown at 203. The verification is done by analyzing the outcome of CFM message forwarding and receiving.

It is expected that during the life of this patent many relevant devices and systems will be developed and the scope of the terms herein, particularly of the terms messages, packets, frames, and links are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed:

1. A maintenance entity in an Ethernet Connectivity Fault Management (CFM) domain, comprising:
   a port definer module;
   a connection configured to be connected to a group of aggregated physical links, said group of links comprising a single logical link to which packets are directed;
   said port definer module being configured to designate any one physical link of said logical link as required for examining of said designated physical link of said logical link, said designation comprising forwarding at least one CFM message to said logical link in such a way as to be forwarded over said logical link specifically via said designated physical link, said designation being available for each physical link separately, thereby allowing examination according to requirement of any physical link of said logical link.

2. The maintenance entity of claim 1, wherein said port definer module is configured to examine a designated link of said group by receiving at least one CFM message via said designated link.

3. The maintenance entity of claim 1, wherein said maintenance entity is one member of the group consisting of: a maintenance entity point (MEP) and a maintenance entity group (MEG) intermediate point (MIP).

4. The maintenance entity of claim 1, wherein said CFM message is one member of the group consisting of: a continuity check message; a loopback message; a Link trace message; an alarm indication signal; a remote defect indication; a locked signal function; a test signal; a maintenance communication channel; a Vendor specific check; and an experimental operation, administration and maintenance (OAM) check.

5. The maintenance entity of claim 1, wherein said CFM domain is implemented on one member of the group consisting of: a virtual local area network (V-LAN), a local area network (LAN), and an Ethernet service network.

6. The maintenance entity of claim 1, wherein said designated link is associated with an additional maintenance entity of said CFM domain.

7. The maintenance entity of claim 6, wherein said additional maintenance entity is associated with a certain flow point.

8. The maintenance entity of claim 7, wherein said flow point is one member of the group consisting of: a switch port, a gateway port, a network port, a network node comprising a processing unit, and a network node comprising a switching unit.

9. The maintenance entity of claim 1, wherein said CFM message comprises at least one LAG member field, said at least one LAG member field being configured for specifying said designated link.

10. The maintenance entity of claim 9, wherein said forwarding is done according to said at least one LAG member field.

11. The maintenance entity of claim 1, wherein said port definer module is configured to distinguish between said at least one CFM message and other messages.

12. The maintenance entity of claim 11, wherein said other messages are forwarded according to at least one balancing algorithm, said at least one CFM message being forwarded according to a coupled specification.

13. The maintenance entity of claim 1, further comprising a user interface configured for allowing a system operator to separately mark each aggregated link of said group, said forwarding being done according to a match between said marks and said at least one CFM message.

14. A system for using Connectivity Fault Management (CFM) functions to examine aggregated link connections, said system comprising:
a plurality of maintenance entities connected to a CFM domain, each one of said maintenance entities comprising a port definer module;
at least one group of aggregated physical links comprising a single logical link, configured for connecting a first and a second of said plurality of maintenance entities;
the port definer module of said first maintenance entity being configured to designate any physical link as required of said single logical link, and examine said designated link of said single logical link by forwarding at least one CFM message to said second maintenance entity via said logical link in such a way that said CFM message is passed specifically via said designated physical link, thereby to allow examination of any physical link of said single logical link.

15. The system of claim 14, wherein each of said maintenance entities is one member of the group consisting of: maintenance entity points (MEPs) and maintenance entity group (MEG) intermediate points (MIPs).

16. The system of claim 14, wherein said CFM message is one member of the group consisting of: a continuity check message; a loopback message;
a Link trace message; an alarm indication signal; a remote defect indication; a locked signal function; a test signal; a maintenance communication channel; a Vendor specific check; and an experimental operation, administration and maintenance (OAM) check.

17. The system of claim 14, wherein said CFM domain is implemented on one member of the group consisting of: a virtual local area network (V-LAN), a local area network (LAN), and an Ethernet service network.

18. The system of claim 14, wherein said CFM message comprises at least one LAG member field, said at least one LAG member field being configured for specifying said designated link.

19. The system of claim 18, wherein said forwarding is done according to said at least one LAG member field.

20. The system of claim 14, wherein said port definer module is configured to distinguish between said at least one CFM message and other messages.

21. The system of claim 20, wherein said other messages are forwarded according to at least one balancing algorithm, said at least one CFM message being forwarded according to a coupled specification.

22. A method for implementing connectivity fault management (CFM) functions in a network, comprising:
a) connecting first and second maintenance entities via a link aggregation group (LAG), said LAG comprising a single logical link made up of a plurality of physical links;
b) using said first maintenance entity to select one of said physical links as a designated link for forwarding a CFM message via a designated link of said LAG; and
c) verifying the functioning of said designated link by analyzing the outcome of said forwarding, each of said physical links being selectable as said designated link, thereby to provide for examination as required for any physical link of said group comprising said single logical link.

23. The method of claim 22, wherein said designated link is directly associated with said second maintenance entity.

24. The method of claim 23, wherein said first and second maintenance entities are associated with respective flow points.

25. The method of claim 24, wherein each one of said flow points is one member of the group consisting of: a switch port, a gateway port, a network port, a network node comprising a processor unit, and a network node comprising a switching unit.

26. The method of claim 22, further comprising a step between step (a) and step (b) of marking aggregated links of said LAG, wherein said forwarding of step (b) is done according to a match between said CFM message and one of said marks.

27. The method of claim 22, wherein each one of said first and second maintenance entities is a member of the group consisting of: a maintenance entity point (MEP) and a maintenance entity group (MEG) intermediate point (MIP).

28. The method of claim 22, wherein said CFM message is one member of the group consisting of: a Continuity Check Message; a Loopback Message; a Link Trace Message; an Alarm Indication Signal; a Remote Defect Indication; a Locked Signal Function; a Test Signal; a Maintenance Communications Channel; a Vendor Specific check; and an Experimental operation, administration and maintenance (OAM) check.

29. The method of claim 22, wherein said network is one member of the group consisting of: a virtual local area network (V-LAN), a local area network (LAN), and an Ethernet service network.

30. The method of claim 22, wherein said CFM message comprises at least one LAG member field, said at least one LAG member field being configured for specifying said designated link.

31. The method of claim 30, wherein said forwarding of step (b) is done according to said at least one LAG member field.

32. An entity for maintaining connectivity in an Ethernet Connectivity Fault Management (CFM) domain, comprising:

a port definer module;

a connection configured to be connected to a group of aggregated physical links, said group of links comprising a single logical link to which packets are directed;

said port definer module being configured to designate any one physical link of said logical link as required for sending an Ethernet packet via said designated physical link of said logical link, said designation comprising forwarding at least one CFM message to said logical link in such a way as to be forwarded over said logical link specifically via said designated physical link, said designation being available for each physical link separately, thereby allowing forwarding via any specific physical link of said logical link and maintaining connectivity despite faults in some of said physical links.

* * * * *